United States Patent Office 3,251,039
Patented May 10, 1966

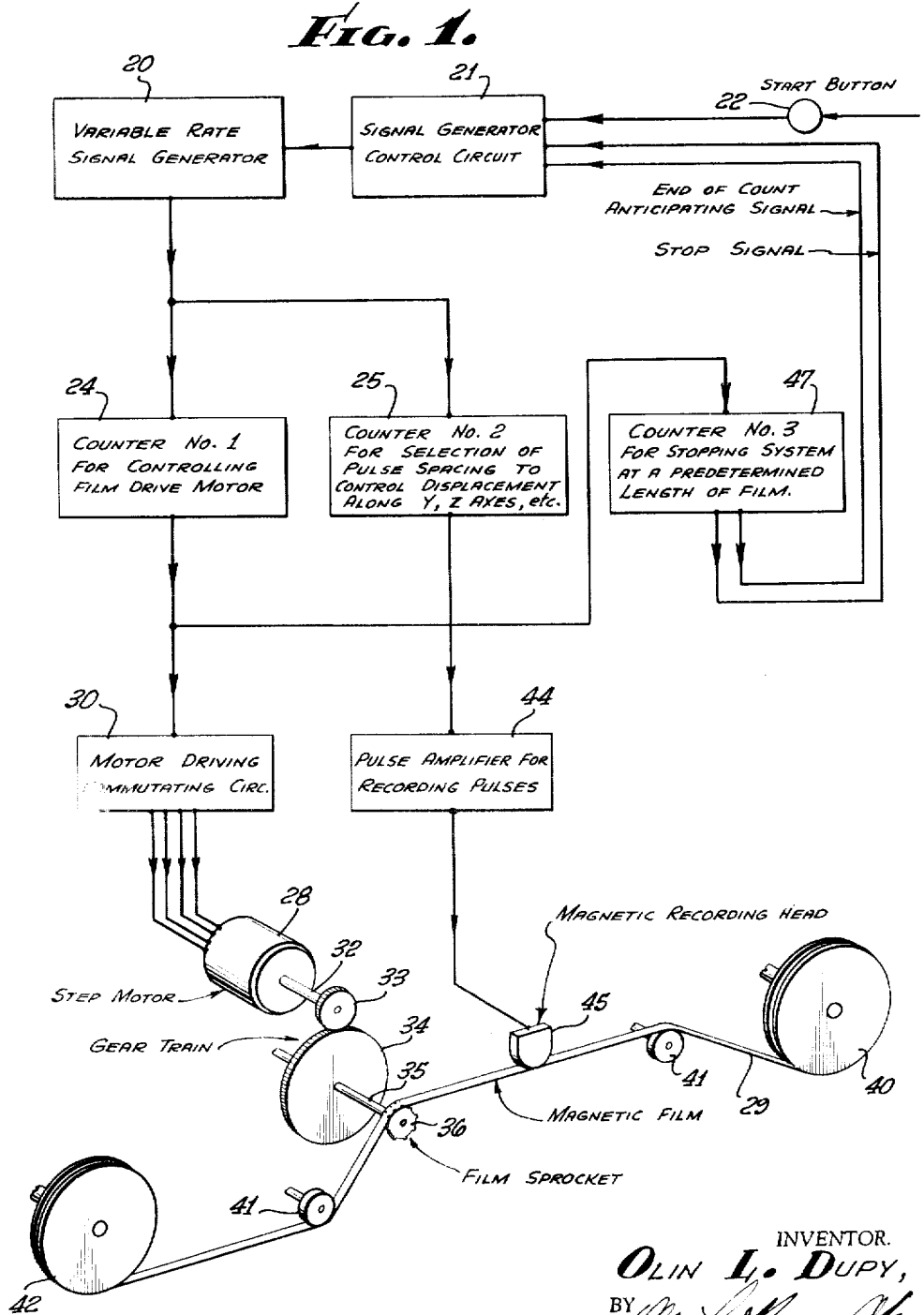

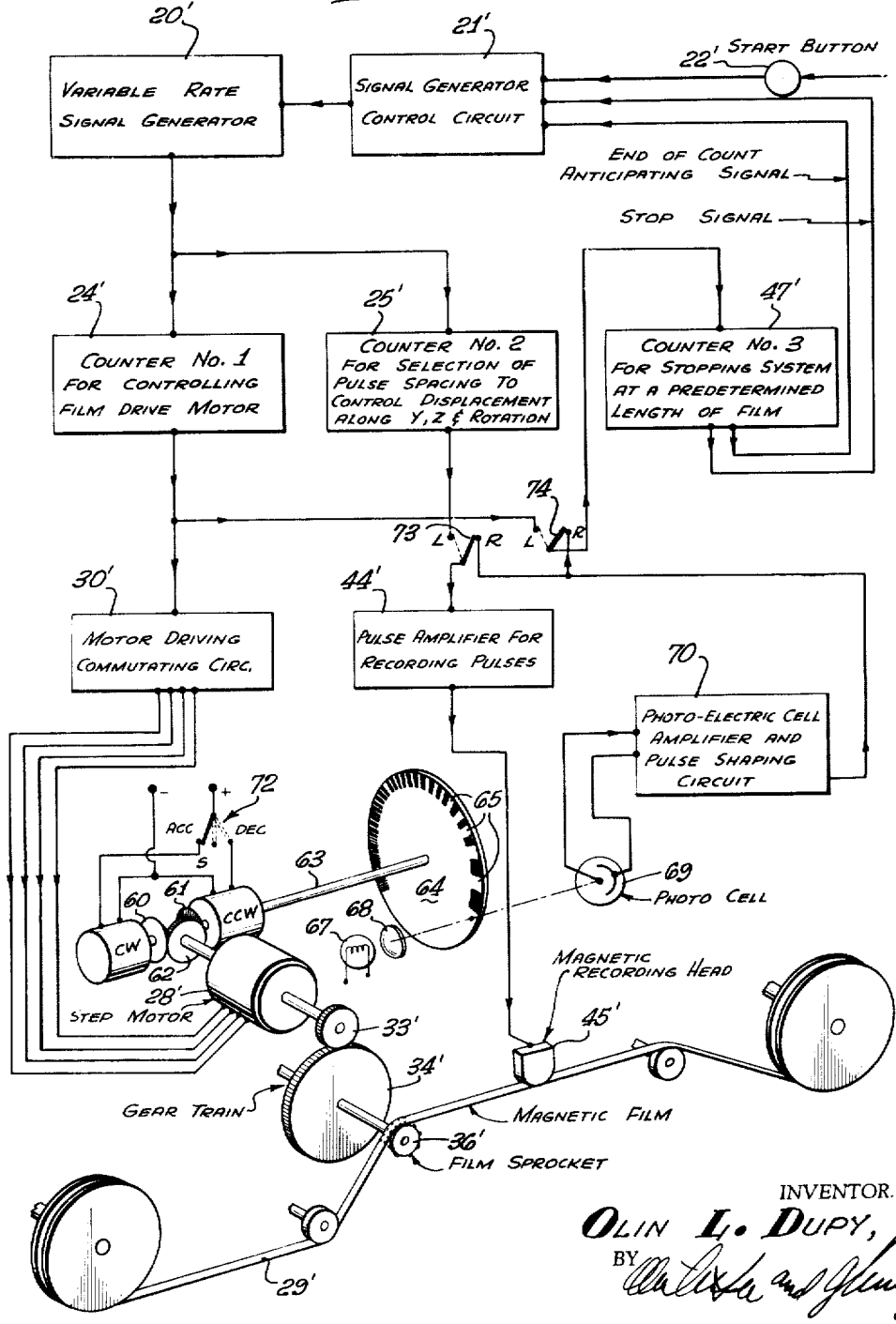

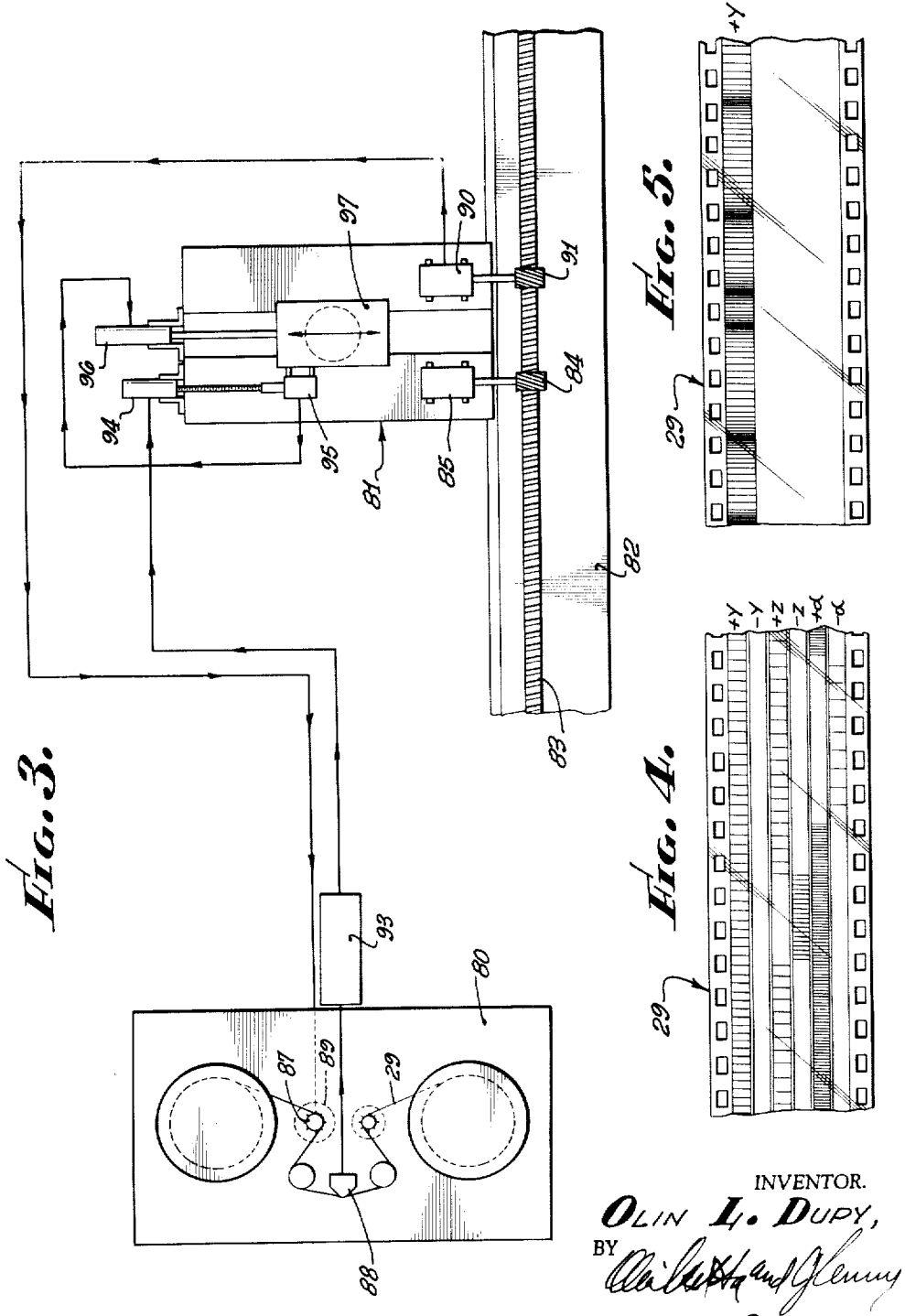

3,251,039
RECORDING SYSTEM FOR PROGRAMMING A PULSE CONTROLLED PATH FOR A MACHINE TOOL
Olin L. Dupy, West Los Angeles, and Paul P. M. Dubosclard, Los Angeles, Calif., assignors to Wiesner-Rapp Company, Inc., Buffalo, N.Y., a corporation of New York
Original application Dec. 6, 1957, Ser. No. 701,112. Divided and this application Nov. 21, 1961, Ser. No. 169,161
(Filed under Rule 47(a) and 35 U.S.C. 116)
10 Claims. (Cl. 340—172.5)

This invention relates to a means for and method of recording and utilizing information relating to predetermined spatial positioning and movement of an object, and more particularly to a simple effective method and apparatus for precise accurate control of machine tool by utilizing data or information storage means such as magnetic film tape and the like for recording pulse commands directly derived from numerical coordinate information.

This application is a divisional application of application Serial No. 701,112 filed Dec. 6, 1957 which is being abandoned in favor of this divisional application and a continuation-in-part application Serial No. 168,566, now abandoned, filed concurrently herewith and directed to a control system for a machine tool.

The present invention relates to recording information for use in the control of a machine tool (a cutting element) to which may be imparted a predetermined precise controlled motion for cutting of metal. Generally speaking, a predetermined path along which such a tool may move may include motion of the tool along a longitudinal (or X) axis and simultaneously therewith motion in lateral directions relative to said longitudinal axis (as along Y and Z axes). Motion of the tool may also include rotation about said longitudinal axis. Movement of the tool from one position to another position along a preselected path may include one or more combinations of such motion along the X, Y and Z axes and may further include motion at a preselected constant rate of speed and also accelerated or decelerated rates of speed.

Prior proposed methods for recording position data relating to successive or progressive spatial positioning of such a tool or a point have included complex, expensive, electronic equipment such as computors with large memory capacity. In such prior proposed methods, data is fed into such memory devices, stored therein, and then simultaneously extracted therefrom so that a record of all information concerning a selected position of a point would be simultaneously transmitted to a recording device such as punched tape, magnetic tape, or other like data recording or storage means. Such prior magnetic tapes were usually driven by friction rollers past a multiple recording head which simultaneously impressed in a plurality of parallel tracks on the magnetic tape all information or commands for all motions at the same time. The exact amount of tape impressed with these commands is not known nor capable of convenient determination because of slippage of the friction roller drive, thermal expansion and varying thickness of the tape, and the speed of the tape was not precisely determined. Alteration of data on such a tape was difficult and inaccurate. In each such prior proposed method known to me the recording of position data from which desired motion of the point or tool was obtained was related to an arbitrarily selected reference means such as time or an arbitrarily produced reference signal which contained no information or intelligence as to location of the point. Thus prior systems and methods were made complicated because of such correlation to a non-informational reference means and other shortcomings of such a reference system will be described later.

In the present invention a novel method and apparatus are provided which utilize coordinates of a point along one of the major directions of displacement of the point or with respect to one of the axes X, Y and Z. In the present example, displacement of a point along the X axis is correlated to displacement of the point in the direction of Y and/or Z axes and rotational motion about the X axis is furnished in terms of the location of the point along the X axis. Thus displacement of a point is prepared specifically as a function of the point displacement along X axis.

The advantages of relating such point location data in terms of the X axis (or the abscissa) will be readily apparent to those skilled in the art when, for example, the problem of simultaneously programming a large number of tool movements for a multiplicity of tools is made with respect to a milling machine having a carriage carrying a plurality of milling heads and capable of milling an aircraft frame member such as a wing spar. All milling heads may be cutting at the same time and each motion of each head must be individually and independently controlled in order to place the milling heads in correlated positions at all time. Thus, for example, a plurality of control channels may be required to produce desired point displacement along X, Y and Z axes and rotation around one of these axes. In preparing the data necessary to mill an aircraft frame member with such a milling machine, a data tabulation may be prepared in well known manner giving X, Y and Z coordinates of each pertinent point of the work. Cutting information, such as the diameter of the cutter to be used, the number of cutting edges, the revolutions per minute of the cutter, and the speed of motion along the several axes may also be provided and is combined with the work data to furnish coordinates of a point on the axis of a cutter in relation to some fixed original point. The work data and the cutting data is usually furnished in terms of the X or longitudinal axis of the work so that information as to the locaiton of each pertinent point on the work to be milled is already supplied in terms of the X axis and additional conversion of such information is not required with respect to time or other arbitrary references, when using the method and apparatus of this invention.

In the milling of aircraft frame members which might be sixty feet or more in length, the mass of the carriage with its milling heads is very large and time required to accelerate and decelerate such a large mass is a variable and important factor. In prior proposed systems for cutting members of short length the uncertainty of movement of such a mass is usually eliminated by incorporating in the data programming a closed loop circuit for control of movement along the X axis so that errors in cutting along the X axis will be compensated for. A closed loop is impractical for use in cutting members of long length because of complexity and cost. An important advantage of the present invention is that a closed loop is not required because any error along the X axis in relation to time has no effect upon the accuracy of correlated motion along the Y or Z axis or rotation about the X axis because such motion is in terms of the X axis.

This advantage is readily recognized when the present system is applied to spar milling where the speed of point displacement along the X axis is much greater than along the other axes. When amount of motion along the X axis is produced by signals on a tape, speed becomes an important factor because either the signals on a tape are so closely spaced to be practically indistinct or the length of the tape (and therefore the speed of travel of the tape) would be impractical. The present system contains commands only for point displacement along axes other than X. Motions along such other axes are relatively slow, and therefore the density or spacing of command pulses on the tape is within practical limits.

Thus, in the present invention, not only does the normally prepared numerical information not require conversion to utilize the same, but inaccuracies with respect to time as the point progresses along the X axis are not transmitted to or have any effect upon command pulses recorded with respect to the Y and Z axes and rotation about the X axis.

A general object of this invention is to provide a novel method and means for controlling movements of a machine cutting tool by transmitting commands to said tool in relation to its displacement along one axis.

An object of this invention is to disclose a simple effective programming system for recording and utilizing numerical data in relation to displacement of a point in one direction.

An object of this invention is to disclose and provide a novel simple method and apparatus for recording command pulses on a memory device such as magnetic tape and wherein the disadvantages and complications of prior proposed methods and apparatuses for recording data are obviated.

An object of this invention is to disclose and provide a novel method of recording motion command pulses which may be selectively altered or amended in part without rendering other pulses recorded thereon inaccurate.

Another object of this invention is to disclose and provide a novel method for recording command pulses for controlling motions of a tool along or around various axes wherein accurate correlation of movements at all points along a selected axis is maintained and is expressed as a function of tool displacement along said axis.

Still another object of this invention is to disclose and provide an apparatus for automatically recording pulses with selected progressive spacing for providing selected accelerated or decelerated motion of a machine tool.

A still further object of this invention is to disclose and provide a simple effective method and apparatus for recording command pulses which is relatively inexpensive, requires a minimum of maintenance, and which is precisely accurate and reduces to a minimum error.

A further object of this invention is to disclose and provide an exemplary apparatus for recording selected command pulses wherein a tape or film is positively driven a predetermined amount in relation to a record of pulses being impressed upon the tape.

A still further object of this invention is to disclose and provide such an apparatus wherein a pulse source actuates motor driving means for driving a recording tape and wherein said pulse source is also related to command pulses recorded on said magnetic tape.

Another object of this invention is to provide a programming system for machine tools wherein the simplicity of the system requires no complicated or fragile parts for attachment to a machine using the system.

The present invention further contemplates a spaced pulse recording system wherein a primary pulse signal is fed to a plurality of pulse counters, each of which is designed to emit a secondary pulse in accordance with a predetermined ratio with the primary pulse, one of said secondary pulses being used to actuate a motor driving means for moving a tape with sprocket holes a predetermined amount and the other of said secondary signals being transmitted to an amplifier for recording such pulses upon said tape.

Generally speaking, this invention contemplates a means for recording command pulses for a tool to be moved along a predetermined path wherein a recording film or tape with sprocket holes is positively driven by electrical pulses emitted from a suitable pulse source and wherein command pulses to displace the tool is impressed on the tape in accordance with a preselected ratio of pulses derived from said source. Such recording means also includes a means for stopping movement of the tape after a predetermined length has passed beneath a recording head, such means being directly responsive to a pulse signal actuating the motor driving means, and includes a stop anticipating signal followed by a stop signal. In addition to the above means, the invention contemplates an arrangement for recording pulses in a progressively greater or progressively lesser number of pulses emitted per inch of tape so that constant accelerating or decelerating command pulses may be impressed upon a tape for controlling the rate of motion of a cutting tool.

It will be understood by those skilled in the art that numerous other advantages and objects of this invention will be readily apparent to those skilled in the art from the following description of the drawings in which an exemplary embodiment of this invention is shown.

In the drawings:

FIG. 1 is a schematic view of a recording system embodying one example of this invention, the view including a diagrammatic perspective of a portion of the system.

FIG. 2 is a schematic view of a modification of the system shown in FIG. 1.

FIG. 3 is a schematic view showing an exemplary arrangement for operably connecting the system of this invention to a machine.

FIG. 4 is a plan view of a portion of a magnetic tape illustrating the arrangement of tracks or patterns of magnetized particles.

FIG. 5 is a plan view of a portion of magnetic tape having magnetic particles impressed in accordance with the system of FIG. 2.

In FIG. 1, a schematic diagram of an exemplary recording system embodying this invention is shown. It is understood that numerical data containing position information of each pertinent point to which a cutting tool is to be moved for milling in accordance with a predetermined plan has been computed in well known manner in relation to the major axis of the work, said axis in this example being called the longitudinal or X axis. In other words, such numerical data providing coordinates of pertinent points on drawings which represent the configuration and shape of the surface desired and motion information for rotation about said X axis provides displacement and movement information which defines a preselected path of travel or displacement of a milling tool in terms of or as a function of the X axis.

Means for consecutively receiving such position data with respect to axes Y and Z and with respect to rotation about X axis and consecutively recording the same on a data storage means, such as magnetic film or tape with sprocket holes, includes a suitable variable rate or adjustable frequency signal generator 20 of well known type and manufacture. Exemplary types of signal generators which may be employed are feedback oscillators, resistor condensors, and pulse modulators, it being understood that such examples are not inclusive. A suitable control circuit 21 energized through a start button 22 regulates and controls the output of the signal generator in well known manner and as hereinafter described. The control circuit 21 may be a gating circuit of well known type.

The signal generator 20 produces a selected number $N_o$ of primary signals or pulses which are simultaneously fed to and received by pulse counting means 24 and 25. Each counting means 24 and 25 is of preset recycling type and is capable of counting a selected number of pulses, as for example, any rational number between 1 and 999,999 if the counting means is six decade type. Each counting means 24 and 25 may include a dial or keyboard for selecting a specified number of pulses $N_o$ to be counted as received from the signal generator 20 and for emitting a single secondary pulse in response to the set number of primary pulses $N_0$. Each counting means resets and recycles itself to produce succeeding secondary signals. Thus the secondary pulses emitted by counting means 24, 25 are in direct stepped-down ratio respectively to the primary pulses received. For example, counting means 24 when set to count $N_1$ pulses from generator 20 will thus emit secondary pulses in the ratio of $$\frac{N_o}{N_1} = K$$

Counting means 25 when set to count $N_2$ pulses from generator 20 will emit secondary pulses in the ratio $$\frac{N_0}{N_2} = K_2$$

Counting means 24 provides secondary pulses for controlling motor means 28 for driving or moving magnetic tape 29 in accordance therewith and also for controlling signal generator 20 in order to stop the recording system after a predetermined length of tape has been impressed with recorded data. Secondary pulses emitted from counting means 24 are fed into a motor driving commutating circuit 30 which is designed to incrementally rotate in a definite amount and direction motor 28 of step actuated type for driving said motor in direct response to said secondary pulses. Various circuit means may be provided for causing such pulse directed rotation of motor 28 and such circuit means are not described in detail in this application. An exemplary motor driving circuit for accomplishing this result in novel manner is disclosed and claimed in an application for United States Letters Patent filed concurrently with application Serial No. 701,112 and invented by Jean Valentino.

Motor shaft 32 of motor 28 is cooperably connected with a suitable gear train including drive gear 33 meshed with gear 34 carried by shaft 35 which carries a pair of film sprockets 36 for positive engagement with spaced perforations 37 provided in longitudinal margins of magnetic tape 29. It will thus be readily apparent that incremental rotation of motor shaft 32 in accordance with secondary pulses emitted from counting means 24 will advance tape 29 a predetermined amount. As described hereinafter the secondary pulses emitted from counting means 24 are related to the position changes of a point along the X axis and thus incremental movement of the tape is in direct relation to position changes along the X axis.

The exemplary magnetic tape 29 may be of well known manufacture and includes magnetic particles capable of being magnetized. The tape 29 may be drawn from a suitable supply reel 40, and supported by suitable idle guide rollers 41. Tape 29 positively meshes with and engages film sprockets 36 and may be wound upon take-up reel 42 supported in well known manner.

As mentioned above the primary pulse signals from generator 20 are also fed into counting means 25 simultaneously with those fed to counting means 24. A single secondary signal is emitted by counting means 25 after a selected number $N_2$ of primary pulses are received. The counting means 25 then resets and recycles itself each time $N_2$ primary pulses have been received. Each secondary pulse emitted by counting means 25 is fed to suitable amplifying means 44 to provide sufficient signal power to energize a magnetic recording head 45. The recording head 45 may be a single or multiple type head for recording a single or a plurality of tracks and is positioned in operable relation to tape 29 so that each secondary pulse received by head 45 will magnetize the magnetic particles at one point on the tape. The recorded pulses are exemplarily indicated in FIG. 2 and provide ultimately a plurality of consecutively recorded parallel tracks representing information concerning the position of a point, the tracks representing the Y axis, Z axis, and rotation about the X axis. The data from which counting means 25 is set represents point position data of the Y, Z axes and rotation about the X axis.

It will be apparent that for $N_o$ primary signals from the generator, the tape will advance $$\frac{N_o}{N_1} \times c \text{ inches}$$

($c$=gear constant) and will record $N_o/N_2$ pulses and the tape will receive $$\frac{N_o}{N_2} \div \left(\frac{N_o}{N_1} \times c\right) = \frac{N_1}{N_3} c_1$$

pulses per inch of tape. Thus feeding selected data to counting means 24 and 25 will produce a record of point position data directly related to the length of the tape impressed with the recorded pulses.

Counting means 47 may be provided for stopping the recording system at a predetermined length of tape and may be non-resetting, non-recycling type. Counting means 47 is fed by secondary pulse signals emitted by counting means 24 and may be provided with two setting means responsive to the number of secondary pulses received. After a preselected first number of pulses have been counted, one pulse is emitted by means 47 which is fed to the generator control circuit and which causes the rate of emission of the primary signals from the generator to be reduced. Thus the rate of movement of the tape and the rate of recording information will be reduced in the same proportion since both are in direct relation to the rate of emission of the primary signal. After primary signal emission is reduced and a preselected second number of secondary pulses have been counted as selected by the second setting of the counting means 47, a second single stop pulse is emitted by means 47 and is fed to the control circuit 21. The circuit is de-energized by the stop pulse and recording and tape movement are stopped.

The signal generator 20, the pulse counting means 24, 25, and 47, as well as the control circuit 21, are examples of devices well known in the trade and referred to by the trade in such manner. Such counting means and signal generator are also described in my Letters Patent 2,931,689. A very specific example of a pulse counter useful in the system of this invention is a model No. 6016A made by Computer Measurements Corporation, however, it will be understood that other types of pulse counters may be employed in this invention. Similarly, the control circuit 21 for adjusting the frequency of the signal generator and also starting and stopping the signal generator, is well known in the trade.

Operation of the recording system will be readily apparent from the above description. Tabulated combined displacement data derived in well known manner may require movement of a cutter axis from point A (coordinates $X_1Z_1$) to a point B (coordinates $X_2Z_2$). The carriage of the milling machine must advance along the X axis a distance $X_2-X_1$ while the cutter is moved in the direction of the Z axis $Z-Z_1$. The numerical setting of counting means 24 (controls tape travel) will be $N_1$ which equals $X_2-X_1$. Likewise setting of counting means 25 (Z axis position data) will be $N_2$ which equals $Z_2-Z_1$. Each of $N_1$ and $N_2$ may be multiplied by a selected constant which depends upon the desired precision or fineness of control of the cutting heads. Counting means 47 will be set to numbers $N_3'$ and $N_3$, $N_3$ being equal to $X_2-X_1$ multiplied by a different constant and determines the length of film to be impressed with motion command pulses and $N_3'$ being a number representing a shorter length of film to provide the anticipating signal for reducing the rate of primary signal emission.

It is important to note that with the above described recording method and means the film or tape is positively incrementally advanced beneath a recording head, that the movement of the film and the recording of command pulses thereon are derived from the emission of a primary signal, and that the positive movement of the film is in accordance with cordinates of the position of a point with respect to the X axis. After pulses are recorded relating to an axis such as Y, the film may be rewound (manually or by a power driven film reel) to an identified starting point and then a second track may be recorded parallel to the first track to contain command pulses relating to the Z axis in terms of the X axis. The recording head may be of single or multiple type, a single head being repositioned and a different segment of multiple head being utilized to accomplish the second or successive track recordings. It should also be noted that any rational number of pulses may be recorded per inch on any selected length of film or tape.

It will be noted that each track of impressed magnetic particles controls one motion of a cutting head on a carriage. It may be desirable to provide two tracks per motion for recording pulses relating to positive and negative displacement of the cutting head (FIG. 4). The portion of magnetic tape shown in FIG. 4 illustrates schematically an arrangement of pulses for motions along Y, Z, and rotation about X. Positive displacement only is shown along Y, while along Z and rotation about X is illustrated as including both positive and negative displacement. Motion of the carriage along the X axis does not change in direction during a working pass on machines for which this recording system is intended.

Motion command pulses recorded on a data storage means in the above manner may be reproduced and utilized as illustrated in FIG. 3. A tape reading device or reproducer 80 may be mounted on a carriage 81 movable under suitable control means including manual control along a bed 82 by means of a rack 83 engaged by a pinion 84 driven by a carriage drive motor 85. The reproducer 80 includes a tape drive sprocket 87 for positively moving tape 29 over a play-back head 88 which may include tape reading segments for respective data storage tracks. The tape drive sprocket 87 is positively geared to or connected with the carriage drive means through a slave motor 89, such as a Selsyn motor, operably connected to a master generator 90 which in this schematic example is driven by a pinion gear 91 engaged with rack 83. It is understood that generator 90 may be directly coupled to the carriage drive motor to provide a positive connection with the reproducer. A carriage position indicator 92 may be directly connected with one of the tape sprockets so as to directly indicate the position of the carriage in thousandths of an inch.

When the carriage moves along the bed, the positive connection of the carriage drive means with the tape moves the tape in operable association with the playback head 88 in terms of X and the head simultaneously reads all of the tracks on the tape so that all motions of the cutting heads are correlated. A pulse is emitted for each magnetized particle that passes the head 88; such pulse is amplified by pulse amplifier 93 and fed to a commutation circuit to cause a step motor 94 to rotate an incremental amount for each pulse. Step motor 94 may be operably connected to a tracer valve 95 which may actuate a hydraulic actuating cylinder 96 for causing movement of a milling head 97 on carriage 81 in response to the commands of the data on tape 29. Translation of such incremental rotation may be made through well known means with sufficient power to control the desired motion. It will be understood that the schematic showing in FIG. 3 is simplified and that actually each segment of the playback head and various components of the system would be connected by two or more lines to permit travel of cutting tools in positive and negative directions.

It should be noted that all recorded pulses for all motions other than along X are in terms of X and positively related thereto. Thus the speed of the carriage will not affect relative motion of the cutting heads. If desired, the tape may include a track to control speed of the carriage and since the pulses recorded relating to speed will be as a function of X, inaccuracies in speed control will not affect correlation of movements of the cutting tools.

It will thus be apparent that the above described recording system provides a means for recording command pulses relating to each motion of a point consecutively on a magnetic tape in such a manner that any portion of the recorded pulses may readily be altered or changed by erasing the recorded information and inserting the desired information. Such is readily accomplished because the tape may be rewound to its starting point and as the tape is moved from the starting point, the length of travel of the tape is directly related to the position data of a point taken along the X axis. Thus, if a change is to be made at a point a selected distance from the starting point, the tape can be wound actuating the step motor through the pulsing system until that selected point is reached on the tape and changes with respect to the X and Y axes or rotation about the X axis may be effected first on one track and then on another track, if necessary, in consecutive relation. This is possible because of the positive drive of the tape through the step motor and film sprockets in accordance with the preselected step-down ratio of the primary pulses by the counting means 24.

It will be readily apparent that the above described recording system provides for the recording of any rational number of pulses per inch on any selected length of tape. Since the milling heads carried thereby have a large mass, it is desirable to be able to accelerate or decelerate the milling heads without loss of accuracy. In FIG. 2, a modification of the recording system is illustrated to provide for recording data for accelerating or decelerating movement of a cutting tool. In FIG. 2, like parts are identified with like reference numerals having a prime sign and since the variable signal generator 20′, signal generator control circuit 21′, counting means 24′ 25′, and 47′ and motor drive commutating circuit 30 are operable in the manner described above, this description of the embodiment will be directed only to the accelerating and decelerating means.

Means for providing such acceleration or deceleration may include a pair of miter gears 60 and 61 driven by a gear 62 connected to the shaft of step motor 28′ by any suitable means. A shaft 63 carries miter gears 60, 61 and also, in spaced relation, a rotatable disc 64 which may be provided at its circumferential margin with a plurality of selectively spaced segments 65 of progressively decreasing width. Operatively positioned with respect to the circumferential segmented margin of disc 64 may be a suitable light source 67 with suitable optics 68 for focusing a narrow beam of light on the segmented margin. Directly opposite the light source may be positioned a suitable photoelectric cell means 69 to receive the light beam from light source 67. Light passing through an open or transparent space lying between segments 65 of the disc falls upon the photoelectric cell means and produces a voltage change in the current passing through the photoelectric cell. This voltage change may be amplified by a suitable amplifier and pulse shaping circuit means generally indicated at 70 for emission of a pulse signal as later described.

In operation of the accelerating and decelerating means described above a switch 72 is provided for selecting the direction of rotation of disc 64 to provide for acceleration or deceleration of the motion being recorded. Switch 72 may control magnetic clutches inside miter gears 60 and 61 to disengage or engage a selected clutch. When switch means 72 is in the position illustrated in FIG. 2, the clutch for miter gear 60 is engaged and the disc 64 will rotate, in this example, in a clockwise direction to provide recording of pulses to provide acceleration. The disc 64 is driven in synchronism with tape motion by step motor 28′ in accordance with the secondary pulses emitted from counting means 24′ and it will be apparent that in such clockwise rotation the spacing of segments 65 is such that a progressively greater number of segments will intercept the light beam per unit of time. The photoelectric cell amplifier means 70 is thus provided with voltage changes occurring at an increasing rate.

Meanwhile, switch means 73, positioned at R will feed pulses emitted from amplifier and pulse-shaping circuit means 70 to pulse amplifier 44' for recording on tape 29' through head 45'. The pulses containing acceleration information are recorded upon the magnetic tape in direct relation to movement of the tape and in accordance with a desired acceleration. Thus pulses recorded on the tape will be in progressively closer spaced relation so that when the film is used to control a machine motion, that motion is accelerated at a constant rate. The exemplary division of segments provided on disc 64 may produce constant acceleration from 0 to a maximum speed desired. In the event a speed less than maximum is required, only part of the periphery of the disc is used to control the progressive emission of pulses by means 71.

Since it is desirable to accelerate or decelerate motion during a selected portion of travel of a cutting tool only, means are provided for returning the motion to a constant rate of speed at a selected point. Such means may include a switch means 74 provided in the circuit transmitting pulses from circuit means 70 to head 45' so that the pulse output of the accelerating system is also directed to counting means 47'. Switch means 73 and 74 may be mechanically interlocked so that when switch 73 is moved to R position, switch 74 is simultaneously moved to its R position and counting means 47' will be operative when the accelerating system is used. Thus, when a required number of pulses corresponding to the speed desired have been counted by counting means 47', the emission of the signal generator 20' is stopped through the control circuit 21'. The accelerating system may then be disengaged and made inoperative by moving switch means 72 to neutral position and moving switch means 73, 74 to L position. In such switch position, it will be apparent that the miter gears 60 and 61 are disconnected from the step motor driving the tape and the secondary signal emitted from counting means 25' is fed directly to pulse amplifier 44' and then to the magnetic recording head 45' in the manner described in the prior embodiment.

In the event deceleration is desired, the disc 64 is again brought into the recording circuit by moving switch means 72 to a position for producing counterclockwise rotation of disc 64 and by moving switch means 73 and 74 to R position for transmitting the pulses emitted by the photoelectric cell and circuit means 70 in a manner as above described. It will be understood that switch means 72, 73 and 74 may be manually operated.

The advantages of the above described recording system will be readily apparent to those skilled in the art. It is important to note that the recording system does not simultaneously record all command pulses relating to the position of a point on magnetic tape 29, but instead consecutively records such pulses on related separate tracks, each track being made at a different time. Each track of recorded pulses is directly related to the amount of travel or displacement of the magnetic tape and such tape travel is provided in terms of or in direct relation to the position of a point along the X axis. These recorded pulses are utilized by causing tape travel to be directly related to the speed of a carriage on a milling machine and therefore there is a direct positive relation between the movement of the tape and the movement of the carriage to provide the X coordinate of a point. Since all other coordinates or movements of a point in displacement thereof are related to the X axis as recorded on the tape of this invention, changes in time or changes in speed of motion of the carriage will not produce any change or inaccuracy in the commands given to a cutting tool for positioning of the cutting tool with respect to the Y and Z and rotation about the X axis.

It will be readily apparent that such a pulse recording system is relatively inexpensive, is simple and direct in operation, chances for error are minimized, and a simple, effective, practical recording system and means for utilizing command pulses of such system are provided.

It will be understood that various modifications and changes may be made in the circuits employed in the recording system and in the means for producing the primary signal which may come within the spirit of this invention and all such changes and modifications coming within the scope of the appended claims are embraced thereby.

We claim:

1. Means for recording command pulses related to successive incremental positioning of a machine tool along a selected path of travel comprising in combination: a variable signal source for generating a primary signal; a first signal counting means adapted to receive said primary signal and to emit a first secondary signal in a selected ratio to said primary signal; a second counting means adapted to simultaneously receive said primary signal and to emit a second signal in preselected ratio to said primary signal; the secondary signals emitted by said first and second counting means being related respectively to the desired position of said tool along the major axis of movement of said tool and movement laterally with respect to said major axis; motor driving means actuated by the first secondary signal; a recording tape means positively connected to and driven by said motor driving means; and a recording head means operably positioned with respect to said tape means and adapted to receive the second secondary signal whereby command pulses relating to lateral positioning of said machine tool are recorded on said tape means as said tape means advances in accordance with pulses supplied to the first counting means relating to the position of the tool with respect to said major axis.

2. Means as stated in claim 1 wherein a third counting means is provided, said third counting means being adapted to receive the first secondary signal and to control the emission of the primary signal from said variable signal source.

3. Means as stated in claim 2 wherein said third counting means includes means for counting the secondary signals and are adapted to produce a signal for transmission to said signal source for reducing the rate of emission of said primary signal.

4. Means as stated in claim 3 wherein said means for counting the secondary signals provides an anticipation signal for transmission to said signal source for stopping emission of said primary signal.

5. Means as stated in claim 1 wherein a signal modifying means for the second secondary signal is produced in relation to the first secondary signal of said first counting means.

6. Means for recording pulses, signals, or the like relating to the displacement of a point in relation to movement of said point in multi-directions, comprising: means for emitting a primary signal; a plurality of means for simultaneously receiving said primary signal and for emitting secondary signals in preselected ratios to the rate of emission of said primary signal; recording means, a tape, means for moving said tape in operable recording position with respect to said recording means, said tape means being cooperably associated with one of said secondary signal emitting means whereby said tape is moved in relation to the secondary signal emitted thereby; said recording means receiving secondary signals from other of said secondary signal emitting means for recording such latter signals in direct relation to the said signal of said one of said secondary signal emitting means.

7. Means for recording on a movable tape means command pulses or signals for displacement of a point in relation to movement of said point in one direction comprising: means to emit a primary signal; means to receive said primary signal and to emit a secondary signal in preselected ratio to said primary signal; a tape means with sprocket holes; means connected with said secondary signal emitting means for moving said tape means in accordance with the secondary signal and in direct relation to movement of said point in said one direction.

8. Means as stated in claim 7 wherein said means for moving said tape means includes step motor means actuated by said secondary signal.

9. Means for recording command signals for displacement of a point in relation to movement of said point in one direction, comprising: signal generator means for emitting a primary signal; a first counting means associated with said generator means for receiving said primary signal and for emitting a first secondary signal in preselected ratio to said primary signal; a tape storage means; drive means actuated by said first secondary signal to move said tape storage means in accordance with said first secondary signal; a second counting means for emitting a second secondary signal in response to said primary signal; a recording means associated with said tape storage means and with said second counting means for receiving said second secondary signal and for recording the same on said tape storage means; and means associated with said drive means for moving said tape storage means to selectively vary spacing of said second secondary signal being recorded on said tape means.

10. Means as stated in claim 9 including means connected with said first counting means for receiving the first secondary signal and for emitting a signal in predetermined relation to the number of first secondary signals emitted for stopping the emission of said primary signal.

References Cited by the Examiner

UNITED STATES PATENTS 2,937,367  5/1960  Bailey et al. _____ 340—172.5

ROBERT C. BAILEY, *Primary Examiner.*

MALCOLM A. MORRISON, *Examiner.*